US012032337B2

(12) United States Patent
Blume et al.

(10) Patent No.: US 12,032,337 B2
(45) Date of Patent: Jul. 9, 2024

(54) SLEEVE AND/OR CUFF HOLDER APPARATUS AND METHODS OF USING THE SAME

(71) Applicants: Robert Blume, Crystal Lake, IL (US); Aaron Rutkowski, Lake in the Hills, IL (US)

(72) Inventors: Robert Blume, Crystal Lake, IL (US); Aaron Rutkowski, Lake in the Hills, IL (US)

( * ) Notice: Subject to any disclaimer, the term of this patent is extended or adjusted under 35 U.S.C. 154(b) by 614 days.

(21) Appl. No.: 17/190,767

(22) Filed: Mar. 3, 2021

(65) Prior Publication Data

US 2021/0373499 A1 Dec. 2, 2021

Related U.S. Application Data

(60) Provisional application No. 63/029,838, filed on May 26, 2020.

(51) Int. Cl.
*G04B 37/14* (2006.01)
*A41F 1/00* (2006.01)
*A44B 5/00* (2006.01)

(52) U.S. Cl.
CPC .......... *G04B 37/1433* (2013.01); *A41F 1/002* (2013.01); *A44B 5/00* (2013.01)

(58) Field of Classification Search
CPC ............. Y10T 24/1392; Y10T 24/1394; Y10T 24/1391; A41F 1/002; A44B 5/00; A44D 2203/00; F16B 2/08; F16B 2/10
See application file for complete search history.

(56) References Cited

U.S. PATENT DOCUMENTS

| | | | | |
|---|---|---|---|---|
| 1,483,731 | A | 4/1923 | Kirk | |
| 3,529,328 | A * | 9/1970 | Davison | A47G 25/485 24/303 |
| 5,035,000 | A | 7/1991 | Matthias | |
| 5,052,644 | A | 10/1991 | Arieh et al. | |
| 5,682,653 | A * | 11/1997 | Berglof | G09F 1/10 224/183 |
| 7,120,936 | B2 | 10/2006 | DeSantis | |
| 8,662,682 | B2 * | 3/2014 | Gorodisher | G08B 5/004 359/519 |
| 9,433,251 | B2 | 9/2016 | McLoughlin | |
| 9,500,209 | B2 * | 11/2016 | Bonno | A45F 5/00 |
| 9,581,970 | B2 | 2/2017 | McLoughlin | |
| 9,581,971 | B2 | 2/2017 | McLoughlin | |
| 2008/0104742 | A1 * | 5/2008 | Alperin | A41F 17/02 24/303 |
| 2009/0283197 | A1 * | 11/2009 | Gorodisher | A45C 13/1069 156/60 |

(Continued)

FOREIGN PATENT DOCUMENTS

| | | |
|---|---|---|
| EP | 3287856 | 2/2018 |
| WO | 2011086349 | 7/2011 |

*Primary Examiner* — Robert Sandy

(74) *Attorney, Agent, or Firm* — Scherrer Patent & Trademark Law, P.C.; Stephen T. Scherrer; Monique A. Morneault

(57) ABSTRACT

A sleeve and/or cuff holder apparatus is configured to prevent a sleeve or cuff of a shirt or other wearable garment from covering the face of a wearable device on a user's wrist, such as a watch, smart watch, wrist band, medical device, and/or other wrist accessory. Methods of using the same are further provided.

19 Claims, 4 Drawing Sheets

(56) References Cited

U.S. PATENT DOCUMENTS

| | | | | |
|---|---|---|---|---|
| 2010/0083699 | A1* | 4/2010 | Conigliaro | A45F 5/02 24/303 |
| 2010/0157237 | A1* | 6/2010 | Mor | G02C 3/04 351/155 |
| 2010/0180406 | A1* | 7/2010 | Mor | G02C 3/04 24/3.3 |
| 2011/0094063 | A1* | 4/2011 | Dong | A44B 99/00 24/3.12 |
| 2012/0125046 | A1* | 5/2012 | Vander Wal | H01F 7/0263 24/303 |
| 2019/0350318 | A1* | 11/2019 | Levine | A47K 10/02 |

* cited by examiner

SLEEVE AND/OR CUFF HOLDER APPARATUS AND METHODS OF USING THE SAME

CROSS-REFERENCE TO RELATED APPLICATIONS

The present invention claims priority to U.S. Prov. Pat. App. No. 63/029,838, titled "Sleeve and Cuff Holder Apparatus and Methods of Using the Same," filed May 26, 2020, which is incorporated herein by reference in its entirety.

TECHNICAL FIELD

The present invention relates to a sleeve and/or cuff holder apparatus. Specifically, the sleeve and/or cuff holder apparatus is configured to prevent a sleeve or cuff of a shirt or other wearable garment from covering the face of a wearable device on a user's wrist, such as a watch, smart watch, wrist band, medical device, and/or other wrist accessory. Methods of using the same are further provided.

BACKGROUND

Many individuals wear devices on their wrists. For example, wristwatches have been known and used by individuals for hundreds of years. Indeed, the first known wristwatch can be traced back to the $16^{th}$ century. At first, wristwatches were worn mainly by women, while men tended to use pocket watches until the early $20^{th}$ century. During the $20^{th}$ century, wristwatches improved greatly in quality, driven because of the need for synchronization of war maneuvers during World War I and World War II.

Technological improvements occurred throughout until the mid-$20^{th}$ century with the introduction of the battery-powered quartz watch, followed by electric watches, and now digital timepieces. Now, in the digital age, many different kinds of devices are worn on an individual's wrist, such as smartwatches, health monitors, such as heartbeat monitors, step-measuring devices, and other like medical devices, sometimes all contained in a single device. Smart devices are further connected to the Internet, and allow for monitoring and communication.

Sleeves and cuffs of wearable garments interfere with the use of wearable wrist devices. Generally, in the normal course of use, a sleeve or cuff can variously cover and uncover the wearable wrist device, oftentimes preventing a user from viewing the face thereof. It is often difficult to maintain the sleeve or cuff in a position that allows a user to view the face of the wrist device at all times, thereby causing the user to continuously move the sleeve or cuff from over the wrist device for viewing the same. Such a situation can lead to annoyance and the prevention or difficulty of the proper use of the wrist device.

A need, therefore, exists for an improved device for maintaining a sleeve or cuff from interfering with the proper use of a wearable wrist device. Specifically, a need exists for an improved device for holding the sleeve or cuff in a desired position relative to the sleeve or cuff. More specifically, a need exists for an improved device for clipping or other attaching to a sleeve or cuff and maintaining the sleeve or cuff in a position to allow for the proper viewing of a wearable wrist device.

Moreover, a need exists for an improved device for holding a sleeve or cuff adjacent a wearable wrist device to prevent covering of the same. A need exists for an improved device for holding a sleeve or cuff that is stylish, fashionable, and provides an additional accoutrement to the user. Alternatively, a need exists for an improved device for holding a sleeve or cuff that is unnoticeable to others.

SUMMARY OF THE INVENTION

The present invention relates to a sleeve and/or cuff holder apparatus. Specifically, the sleeve and/or cuff holder apparatus is configured to prevent a sleeve or cuff of a shirt or other wearable garment from covering the face of a wearable device on a user's wrist, such as a watch, smart watch, wrist band, medical device, and/or other wrist accessory. Methods of using the same are further provided.

To this end, in an embodiment of the present invention, a cuff and/or sleeve holder apparatus is provided. The cuff and/or sleeve holder apparatus comprises a cuff holding element comprising a first leg, a second leg, and a bend between the first leg and the second leg, wherein the first leg and the second leg are biased toward each other via the bend.

In an embodiment, the cuff or sleeve holder apparatus further comprises: a first holding element disposed on an end of the first leg; a second holding element disposed on an end of the second leg, wherein the first and second holding elements are configured to hold the ends of the first and second legs together on the cuff or the sleeve.

In an embodiment, the first holding element is a first magnet and the second holding elements is a second magnet.

In an embodiment, the end of the first leg and the end of the second leg are biased together via the first magnet and the second magnet, configured to hold the cuff or sleeve between the first magnet and the second magnet.

In an embodiment, the first magnet and the second magnet having opposite poles facing each other.

In an embodiment, the cuff or sleeve holder apparatus further comprises a first protective element disposed on an inside surface of the first leg, wherein the first protective element is configured to contact the watch band.

In an embodiment, the first protective element is selected from the group of a cloth material and an elastomeric material.

In an embodiment, the cuff or sleeve holder apparatus further comprises a second protective element disposed on an inside surface of the second leg, wherein the second protective element is configured to contact the watch band.

In an embodiment, the second protective element is selected from the group of a cloth material and an elastomeric material.

In an alternate embodiment of the present invention, a system for holding a cuff or sleeve adjacent to a watch band worn on a wrist is provided. The system comprises: the cuff or sleeve holder apparatus; a cuff or sleeve between the first extended leg and the second extended leg; and a watch band disposed between the first extended leg and the second extended leg positioned adjacent the cuff or sleeve.

In an alternate embodiment of the present invention, a method of holding a cuff or sleeve adjacent a watch is provided. The method comprises the steps of: providing a watch on a wrist; providing a cuff or sleeve of a shirt adjacent the watch on the wrist; providing a cuff or sleeve holder apparatus comprising a first leg, a second leg, and a bend between the first leg and the second leg, wherein the first leg and the second leg are biased toward each other via the bend; and holding a watch band of the watch adjacent to the cuff or sleeve between the first leg and the second leg.

In an embodiment, the cuff or sleeve holder apparatus further comprises a first holding element disposed on an end of the first leg; a second holding element disposed on an end of the second leg, wherein the first and second holding elements are configured to hold the ends of the first and second legs together on the cuff or sleeve.

In an embodiment, the first holding element is a first magnet and the second holding elements is a second magnet.

In an embodiment, the end of the first leg and the end of the second leg are biased together via the first magnet and the second magnet further comprising the step of holding the cuff or sleeve between the first magnet and the second magnet.

In an embodiment, the first magnet and the second magnet having opposite poles facing each other.

In an embodiment, the method further comprising the steps of: providing a first protective element disposed on an inside surface of the first leg; and contacting the watch band with the first protective element.

In an embodiment, the first protective element is selected from the group of a cloth material and an elastomeric material.

In an embodiment, the method further comprises the steps of: providing a second protective element disposed on an inside surface of the second leg; and contacting the watch band with the second protective element.

In an embodiment, the second protective element is selected from the group of a cloth material and an elastomeric material.

In an embodiment, the bend between the first and second extended legs is curved.

In another alternate embodiment of the present invention, the second leg pivotally extends from a pivoting element on an end of the bend, and a handle extends from the pivoting element to move the end of the second leg away from the first leg. In an embodiment the end of the second leg has ridges that are configured to hold a cuff in position when disposed between the first and second legs.

In another alternate embodiment, a pair of cuff and/or sleeve holder apparatuses are disposed side-by-side with a bridging plate disposed therebetween, wherein the pair of cuff and/or sleeve holder apparatus are configured to hold a watch band and a cuff of a sleeve in place with a watch face configured to rest on the plate.

In another alternate embodiment of the present invention, a cuff and/or sleeve holder apparatus comprises a band and a plate disposed extending from the band, and a hinged holding element extending from the band, wherein the plate is configured to be disposed beneath a watch face and a cuff of a sleeve, and holding element is configured to fold over a top of the cuff and engage the holding element beneath the cuff.

In yet another alternate embodiment of the present invention a cuff and/or sleeve holder apparatus comprises a band configured to be worn around a user's wrist, a first plate extending from the band, a second plate adjacent the first plate, and a hinge disposed therebetween, wherein the first plate is configured to be disposed beneath a cuff and the second plate is configured to be disposed above a cuff to hold a cuff in place adjacent a watch.

It is, therefore, an advantage and objective of the present invention to provide an improved device for maintaining a sleeve or cuff from interfering with the proper use of a wearable wrist device.

Specifically, it is an advantage and objective of the present invention to provide an improved device for holding the sleeve or cuff in a desired position relative to the sleeve or cuff.

More specifically, it is an advantage and objective of the present invention to provide an improved device for clipping or other attaching to a sleeve or cuff and maintaining the sleeve or cuff in a position to allow for the proper viewing of a wearable wrist device.

Moreover, it is an advantage and objective of the present invention to provide an improved device for holding a sleeve or cuff adjacent a wearable wrist device to prevent covering of the same.

Further, it is an advantage and objective of the present invention to provide an improved device for holding a sleeve or cuff that is stylish, fashionable, and provides an additional accoutrement to the user.

Alternatively, it is an advantage and objective of the present invention to provide an improved device for holding a sleeve or cuff that is unnoticeable to others.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a sleeve and/or cuff holder apparatus. Specifically, the sleeve and/or cuff holder apparatus is configured to prevent a sleeve or cuff of a shirt or other wearable garment from covering the face of a wearable device on a user's wrist, such as a watch, smart watch, wrist band, medical device, and/or other wrist accessory. Methods of using the same are further provided.

Figure 1:
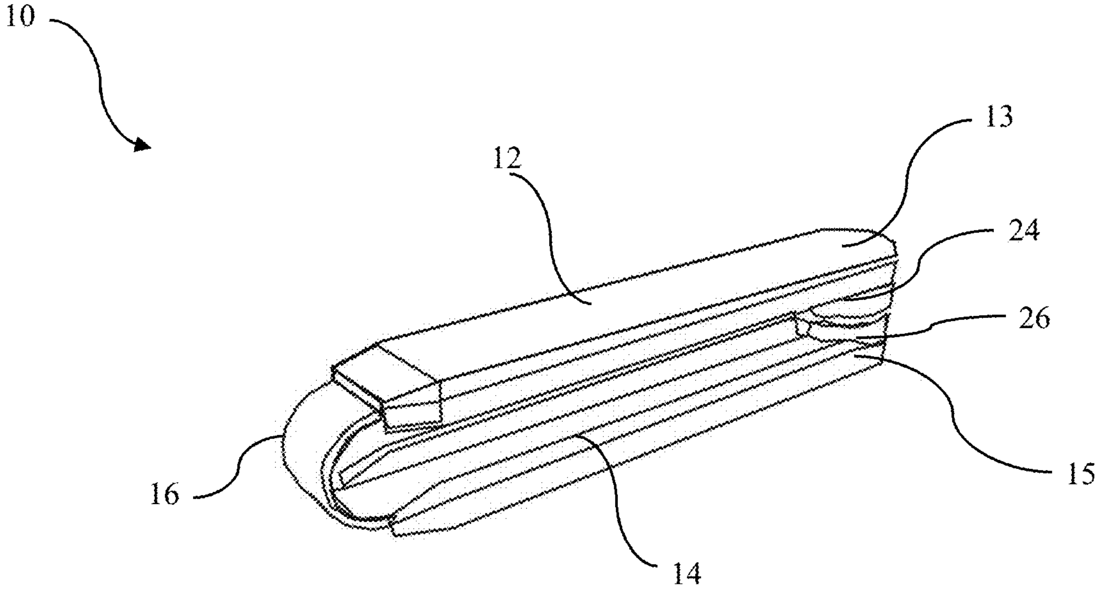
FIG. 1 illustrates a perspective view of a sleeve and/or cuff holder apparatus in an embodiment of the present invention.
Figure 2:
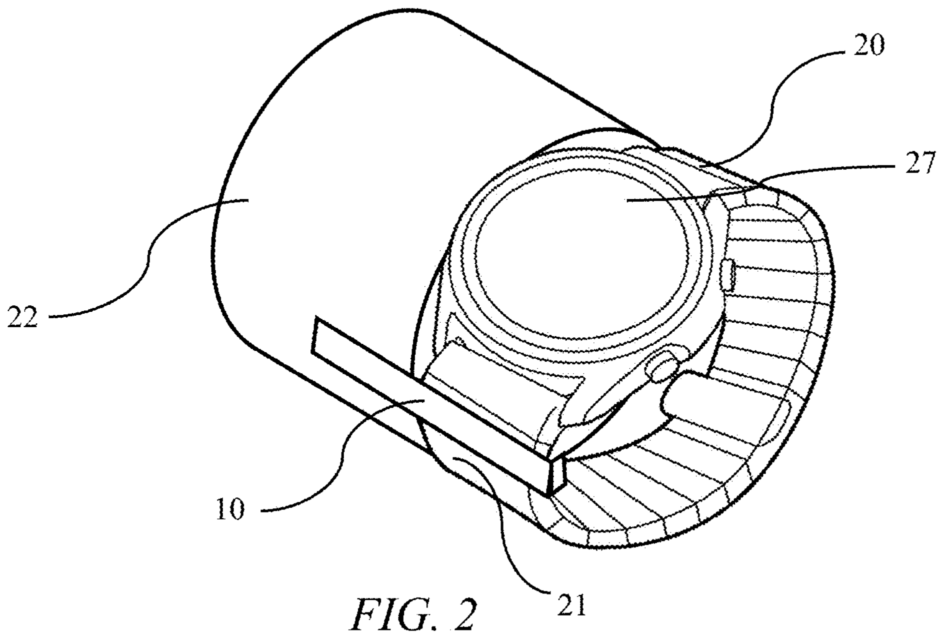
FIG. 2 illustrates a perspective view of a sleeve and/or cuff holder apparatus disposed on a watch and cuff of a sleeve in an embodiment of the present invention.

FIGS. 1 and 2 illustrate a cuff and/or sleeve holder apparatus 10 in an embodiment of the present invention. The apparatus 10 comprises a first extended leg 12 and a second extended leg 14 running roughly parallel to each other, and connected via a bend 16. The bend 16 generally biases legs 12 and 14 toward each so that the ends thereof pinch or otherwise come together. A first magnet 24 may be at or within end 13 of first extended leg 12 and a second magnet 25 maybe at or within end 15 of second extended leg 14, having opposite poles facing each other so that the magnets draw the ends 13, 15 together when in contact. A space between the first and second extended legs 12, 14 may have a distance d that is sufficient to hold both sides of the watch band 21, minimizing movement of the apparatus 10 on the watch band 21.

As illustrated in FIG. 2, the apparatus 10 is disposed so that a watch band 21 of a watch 20 fits within and between first and second legs 12, 14. Likewise, the apparatus 10 is disposed so that a cuff 22 of a sleeve of a shirt (not shown) also fits between first and second legs 12, 14 immediately adjacent the watch band 21. As noted above, in one embodiment, the bend 16 may bias legs 12, 14 toward each other to pinch or otherwise allow the ends 13, 15, thereby holding the apparatus 10 on the cuff 22. Preferably, as illustrated in FIG. 1, magnets 24, 25 may be disposed on the ends 13, 15 of the legs 12, 14, respectively, and may hold the ends 13, 15 of the legs 12, 14, respectively, together via magnetic attraction, through the cuff 22.

The apparatus 10, therefore, holds the cuff 22 adjacent the watch band 21 and thus prevents the cuff 22 from moving and covering the watch face 26 of the watch as the user moves his or her arm. A cloth material, a rubbery elastomeric material, or other soft element may be disposed on inside surfaces of the first and second legs 12, 14 to prevent damage to the watch band 20 and/or the cuff 22.

Figure 3:
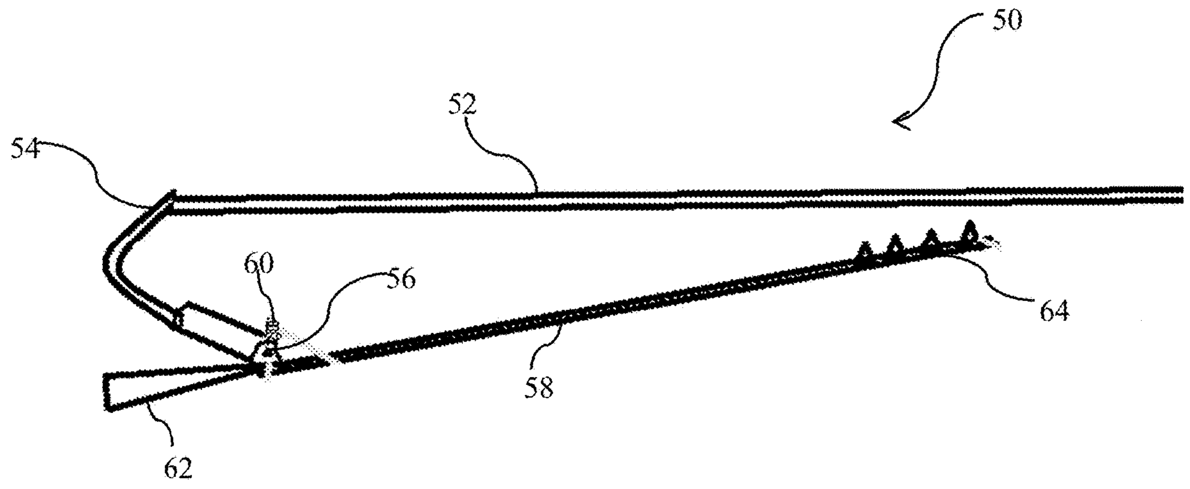
FIG. 3 illustrates a side view of a sleeve and/or cuff holder apparatus in an alternate embodiment of the present invention.

Referring now to FIG. 3, a cuff and/or sleeve holder apparatus 50 is illustrated in an alternate embodiment of the present invention. The apparatus 50 comprises a first elongated leg 52 having a bend 54 on one end thereof. The bend 54 terminates to a pivoting element 56 that may be attached to a second leg 58. The second leg 58 may pivot about pivoting element 56. A spring 60 may bias the second leg 58 toward the first leg 52. A handle 62 may extend from the pivoting element 56, and may be utilized top press, thereby moving second leg 58 away from the first leg 52. Thus, in use, a user may press the handle 62 to move the second leg 58 from the first leg 52 and dispose a watch band (not shown) and, adjacent to the watch band, a cuff of a sleeve (not shown) between the first leg 52 and the second leg 58 in the same manner as shown in FIG. 1. Ridges 64 may be disposed on an end of the second leg 58, disposed toward the first leg 52 to hold the second leg 58 in position on the cuff of the sleeve when disposed thereon.

Figure 4:
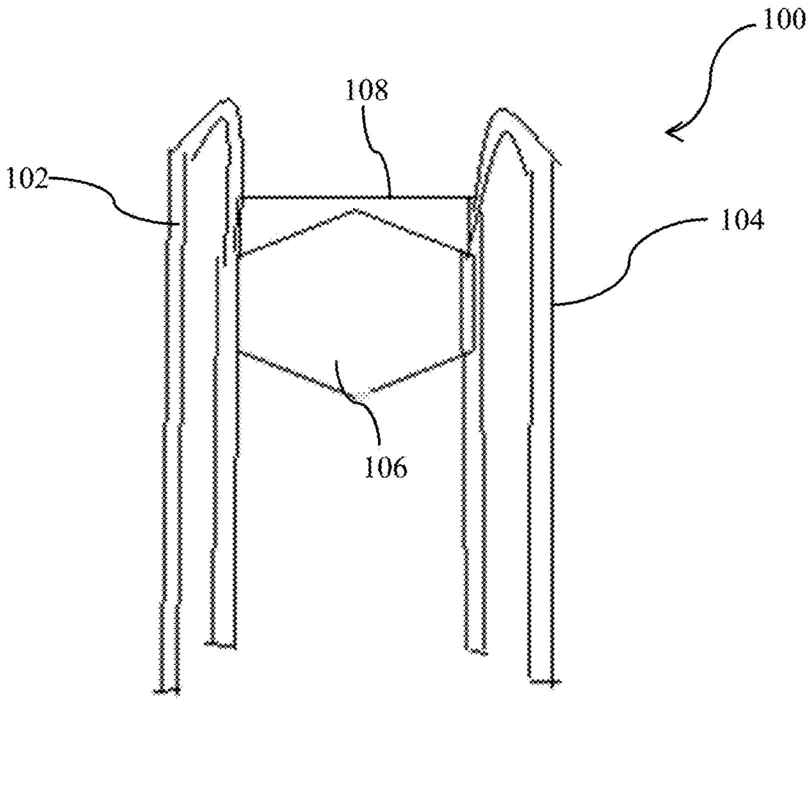
FIG. 4 illustrates a top view of a sleeve and/or cuff holder apparatus in another alternate embodiment of the present invention.

FIG. 4 illustrates yet another embodiment of a cuff and/or sleeve holder apparatus 100 having a first cuff and/or sleeve engagement element 102 and a second cuff and/or sleeve engagement element 104 disposed roughly parallel to each other. The first element 102 and the second element 104 may each be cuff and/or sleeve holder apparatuses 10 or cuff and/or sleeve holder apparatuses 50, as disclosed above. Each of the elements 102, 104 may have parallel extending legs, and may be connected via a bridging plate 106 disposed between the two elements 102, 104. When in use, the first and second elements 102 may be disposed such that a watch band (not shown) on opposite sides of a watch face may be disposed between the parallel legs of the elements 102, 104, and the watch face may rest upon the bridging plate 106. A watch face stopper bar 108 may also bridge between the first and second elements 102, 104, and may engage the side of the watch face closest to the user's hand. Thus, the watch may be held in place via the apparatus 100. A cuff or sleeve may be disposed between the parallel legs of the elements 102, 104 and held adjacent the watch. Thus, the apparatus 100 may hold the cuff or sleeve adjacent the watch face, preventing the same from covering the watch face.

Figure 5:
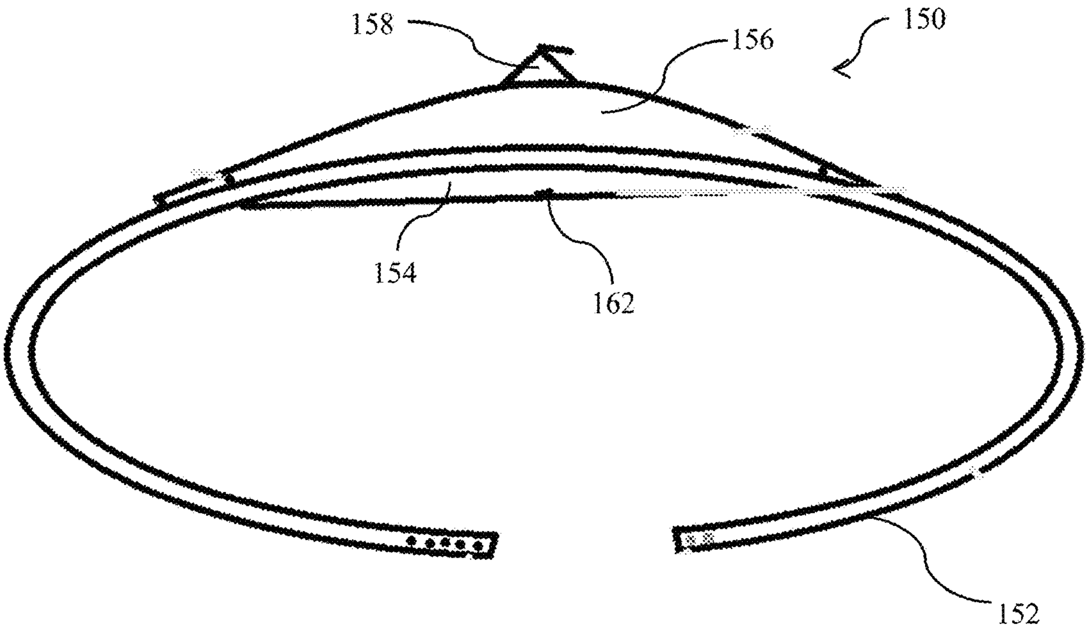
FIG. 5 illustrates a perspective view of a sleeve and/or cuff holder apparatus in yet another alternate embodiment of the present invention.
Figure 6:
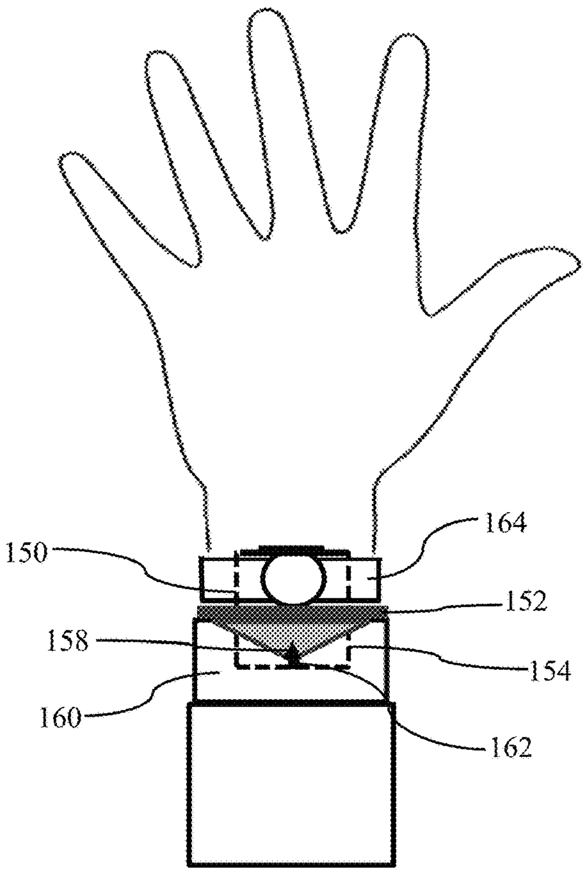
FIG. 6 illustrates a top view of a sleeve and/or cuff holder apparatus disposed on a watch and cuff of a sleeve in yet another embodiment of the present invention.

FIGS. 5 and 6 illustrate yet another embodiment of the present invention of a cuff and/or sleeve holder apparatus 150. The apparatus 150 may include a band 152 that may be disposed around a user's wrist to hold the apparatus 150 in place in position thereof. The band may be adjustable to accommodate different sizes wrists. A plate 154 may extend beneath a top portion of the band 152. A roughly triangular holding element 156 may pivotally extend from the band 152. The holding element 156 may have a clasp or other engagement element 158 on an end thereof for engaging a user's cuff 160, as shown in FIG. 6. The clasp or other engagement element 158 may engage a corresponding receiving element 162 on the plate 154 that may be disposed beneath the user's cuff 160. The clasp may be magnetic, thereby holding the holding element 156 adjacent the plate 154 with the cuff 160 disposed therebetween.

The plate 154, therefore, extending beneath the cuff 160 and watch 164 thereby holding the cuff 160 adjacent the watch 164. A watch face stopper bar 166 may extend from the plate 154, thereby abutting the face of the watch 164 and preventing movement of the watch 164 and cuff 160.

Figure 7:
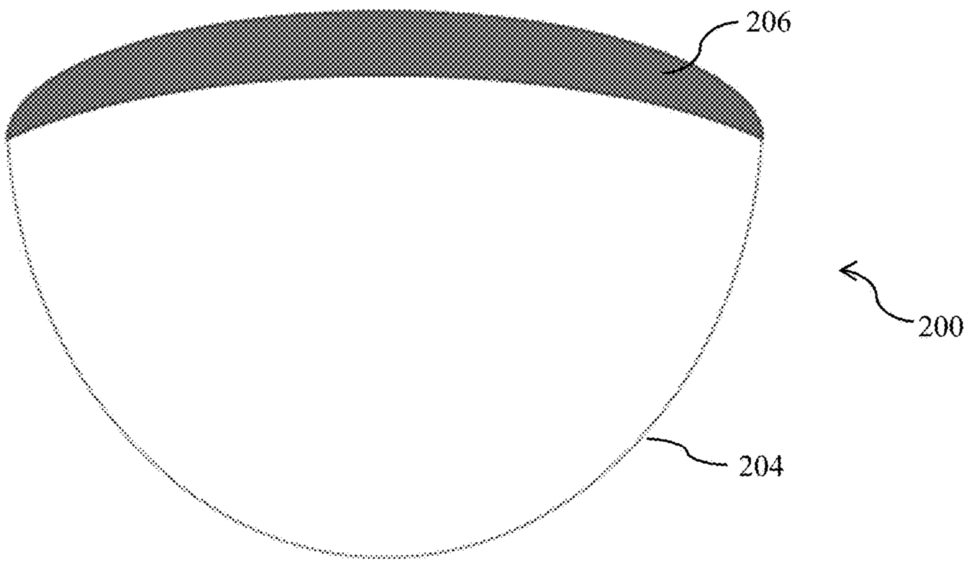
FIG. 7 illustrates a side view of a sleeve and/or cuff holder apparatus in a still further embodiment of the present invention.
Figure 8:
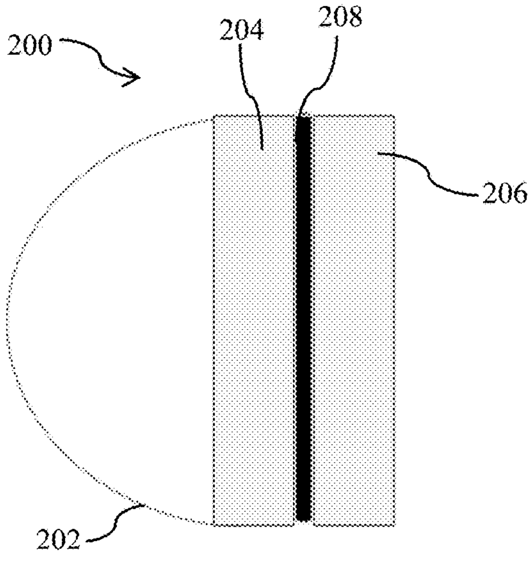
FIG. 8 illustrates a top view of a sleeve and/or cuff holder apparatus in the still further embodiment of the present invention.
Figure 9:
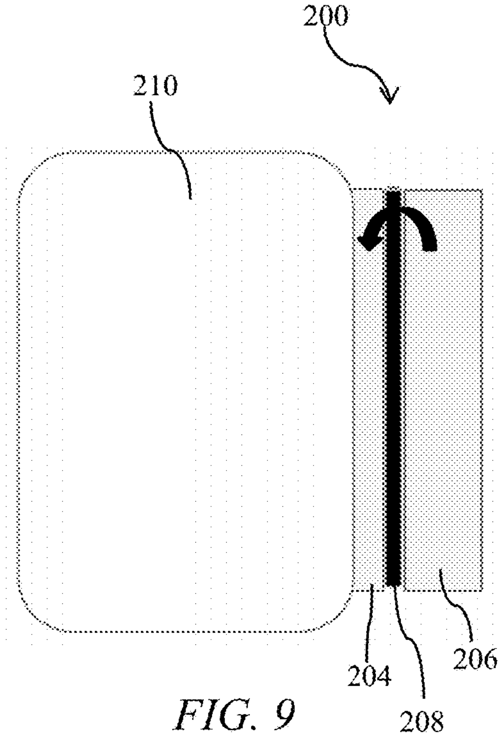
FIG. 9 illustrates a top view of a sleeve and/or cuff holder apparatus aligned with a cuff of a sleeve in the still further embodiment of the present invention.

FIGS. 7, 8 and 9 illustrate a still further embodiment of a cuff and/or sleeve holder apparatus 200. FIG. 7 illustrates a side view thereof and FIG. 8 illustrates a top view thereof. The apparatus 200 may include a band 202 extending from a first plate 204. A second plate 206 may be disposed adjacent the first plate 204 having a hinge 208 disposed therebetween. As illustrated in FIG. 7, the plates 204, 206 may have a curve thereby fitting over and under an end of a cuff 210, as shown in FIG. 9, which shows first plate 204 disposed beneath cuff 210 before the second plate 206 is folded via hinge 208 to cover over the cuff 210. The strap 202 may therefore hold the cuff 210 in position where desired so that the same does not cover a watch (not shown).

Each of the aforementioned apparatuses are configured to hold a cuff and/or sleeve in position on a user's arm relative to a watch to prevent the cuff and/or sleeve from covering the watch. Each are shown in various configurations and various sizes, and it should be noted that each element can be any size or proportion and should not be limited as described herein. In addition, each element may be made from any known material useful for the same, such as metal, plastic, wood, leather, or any other like material. Moreover, various exposed elements of each of the embodiments may have stylish designs and may be made from suitable materials that may be pleasing, such as precious metals or the like.

It should further be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A system for holding a cuff or sleeve adjacent to a watch band worn on a wrist comprising:

a first leg, a second leg, and a bend between the first leg and the second leg, wherein the first leg and the second leg are biased toward each other via the bend, wherein the first leg and the second leg are configured to hold a watch band adjacent to a cuff or sleeve between the first leg and the second leg;

a cuff or sleeve between the first leg and the second leg; and a watch band disposed between the first leg and the second leg positioned adjacent the cuff or sleeve.

2. The system of claim 1 further comprising:

a first holding element disposed on an end of the first leg;

a second holding element disposed on an end of the second leg, wherein the first and second holding elements are configured to hold the ends of the first and second legs together on the cuff or the sleeve.

3. The system of claim 2 wherein the first holding element is a first magnet and the second holding elements is a second magnet.

4. The system of claim 3 wherein the end of the first leg and the end of the second leg are biased together via the first magnet and the second magnet, configured to hold the cuff or sleeve between the first magnet and the second magnet.

5. The system of claim 4 wherein the first magnet and the second magnet having opposite poles facing each other.

6. The system of claim 1 further comprising:

a first protective element disposed on an inside surface of the first leg, wherein the first protective element is configured to contact the watch band.

7. The system of claim 6 wherein the first protective element is selected from the group of a cloth material and an elastomeric material.

8. The system of claim 6 further comprising:

a second protective element disposed on an inside surface of the second leg, wherein the second protective element is configured to contact the watch band.

9. The system of claim 8 wherein the second protective element is selected from the group of a cloth material and an elastomeric material.

10. A method of holding a cuff or sleeve adjacent a watch comprising the steps of:

providing a watch on a wrist;

providing a cuff or sleeve of a shirt adjacent the watch on the wrist;

providing a cuff or sleeve holder apparatus comprising a first leg, a second leg, and a bend between the first leg and the second leg, wherein the first leg and the second leg are biased toward each other via the bend; and holding a watch band of the watch adjacent to the cuff or sleeve between the first leg and the second leg.

11. The method of claim 10 wherein the cuff or sleeve holder apparatus further comprises a first holding element disposed on an end of the first leg; a second holding element disposed on an end of the second leg, wherein the first and second holding elements are configured to hold the ends of the first and second legs together on the cuff or sleeve.

12. The method of claim 11 wherein the first holding element is a first magnet and the second holding elements is a second magnet.

13. The method of claim 12 wherein the end of the first leg and the end of the second leg are biased together via the first magnet and the second magnet further comprising the step of:

holding the cuff or sleeve between the first magnet and the second magnet.

14. The method of claim 13 wherein the first magnet and the second magnet having opposite poles facing each other.

15. The method of claim 10 further comprising the steps of:

providing a first protective element disposed on an inside surface of the first leg; and contacting the watch band with the first protective element.

16. The method of claim 15 wherein the first protective element is selected from the group of a cloth material and an elastomeric material.

17. The method of claim 15 further comprising the steps of:

providing a second protective element disposed on an inside surface of the second leg; and contacting the watch band with the second protective element.

18. The method of claim 17 wherein the second protective element is selected from the group of a cloth material and an elastomeric material.

19. The method of claim 10 wherein the bend between the first and second extended legs is curved.

* * * * *